United States Patent [19]

Imoto

[11] 4,032,071

[45] June 28, 1977

[54] THERMALLY RESPONSIVE VALVE HAVING DUAL OPERATING TEMPERATURES

[75] Inventor: Kazuo Imoto, Yokohama, Japan

[73] Assignee: Texas Instruments Incorporated, Dallas, Tex.

[22] Filed: May 10, 1976

[21] Appl. No.: 684,805

[30] Foreign Application Priority Data

Dec. 29, 1975  Japan .............................. 50-159783

[52] U.S. Cl. ...................... 236/101 E; 123/117 A; 137/468; 236/87

[51] Int. Cl.² ...................................... G05D 23/08

[58] Field of Search ....... 236/101 C, 101 B, 101 E, 236/87, 86, 80 C; 123/117 A; 137/468

[56] References Cited

UNITED STATES PATENTS 3,804,326  4/1974  McIntire ........................ 236/101 E 3,962,868  6/1976  Matumoto et al. ............ 123/117 A Primary Examiner—William F. O'Dea
Assistant Examiner—Henry C. Yuen
Attorney, Agent, or Firm—John Haug; Harold Levine; James P. McAndrews

[57] ABSTRACT

A thermally responsive valve having dual operating temperatures comprises a main body having two openings which are connected through passages in the body to an internal operating space in the body, two dish-shaped bimetal elements disposed in spaced relation to each other within the internal operating space to divide the operating space into three sections, the bimetal elements being movable in response to variations in temperature to engage and disengage respective valve seats to close and open passages between the internal operating space and the openings, and an annular wave-shaped spring arranged between the two bimetal elements holding the elements in said spaced relation.

11 Claims, 9 Drawing Figures

THERMALLY RESPONSIVE VALVE HAVING DUAL OPERATING TEMPERATURES

BACKGROUND AND SUMMARY OF INVENTION

This invention relates to a resetting type of thermally responsive valve means which is useful in switching negative and positive pressure circuits from closed to open and then to closed state in sequence (or from open to closed and then to open state) in response to a unidirectional change in temperature through two predetermined temperature levels while assuring prompt closing or opening of the valve means at precisely predetermined temperatures.

Generally speaking, thermally responsive valves of this type are useful in emission control systems of automobiles where the use of valve means of the wax operating type has been previously proposed. However, wax operating valves are commonly subject to a loss of wax when subjected to overpressures and such loss of wax tends to change the operating temperatures of the valve means. Wax operating valves are also of complicated structure having a relatively high production cost and are thus not adapted for low cost mass production.

It is an object of this invention to provide a thermally responsive valve having dual point temperature response which eliminates the conventional defects of such valves, which has a compact outer appearance and a simple structure, which does not have to be repaired frequently, and which can be easily manufactured.

It is also an object of this invention to provide such a thermally responsive valve which has a high degree of resistance to vibration so that it is adapted for use in automotive emission control systems such as in ignition time control devices and the like. It is also an object of the invention to provide such a valve which is adapted to be positioned in heat-transfer relation to an object such as an engine block of an automobile so that the valve is adapted to be opened and closed in response to increases and decreases in engine block temperature and in which the flow of fluid through the valve is controlled smoothly in response to such increases and decreases in block temperature. It is a further object to provide such valve means adapted to switch fluid flow between passages from open to closed and then to open state, or from closed to open and then to closed state, in sequence in response to unidirectional temperature change including a unidirectional temperature increase or an unidirectional temperature decrease over a wide range.

Briefly described, the novel and improved thermally responsive valve of this invention comprises a main valve body which is equipped with two openings. These openings are connected with an internal operating space in the valve body by separate internal passages in the body. Two dish-shaped bimetal pieces are arranged in spaced relation to each other within the internal operating space in the valve body to divide that space into three sections. An annular wave-spaced spring is arranged within the internal operating space between the two bimetal pieces for holding the pieces in said spaced relation to each other. Each of the bimetal elements is adapted to reverse or invert its dish-shape in response to a change in temperature thereof and valve seats are arranged between the internal operating space and passages leading to the valve openings. The bimetal pieces are arranged within the operating space to engage and disengage respective valve seats as the bimetal pieces reverse or invert their dish-shape in response to temperature change. Where the valve body is provided with two openings connected to the internal operating space by respective passages and with valve seats between the internal space and the respective passages, the bimetal pieces are selected so that, in response to unidirectional temperature change through two temperature levels, one of the bimetal pieces engages a valve seat to close the valve, both bimetal pieces are disengaged from the valve seats to open the valve, and the other bimetal piece engages a valve seat to reclose the valve in sequence, the valve opening and closing occurring promptly as the valve temperature passes through the respective two temperature levels. Alternately, where the valve body has two passages connecting one of the openings to the internal operating space and has valve seats between the internal space and each of these two passages, the bimetals are selected so that a first bimetal engages a valve seat while the second bimetal piece is disengaged from a valve seat to open the valve, both bimetal pieces engage valve seats to close the valve, and then the second bimetal piece engages a valve seat while the first bimetal piece is disengaged from a valve seat to reopen the valve in sequence.

Other objects, advantages and details of the thermally responsive valve of this invention appear in the following detailed description of preferred embodiments of the invention, the detailed description referring to the drawings in which.

DESCRIPTION OF THE EMBODIMENTS

Figure 1:
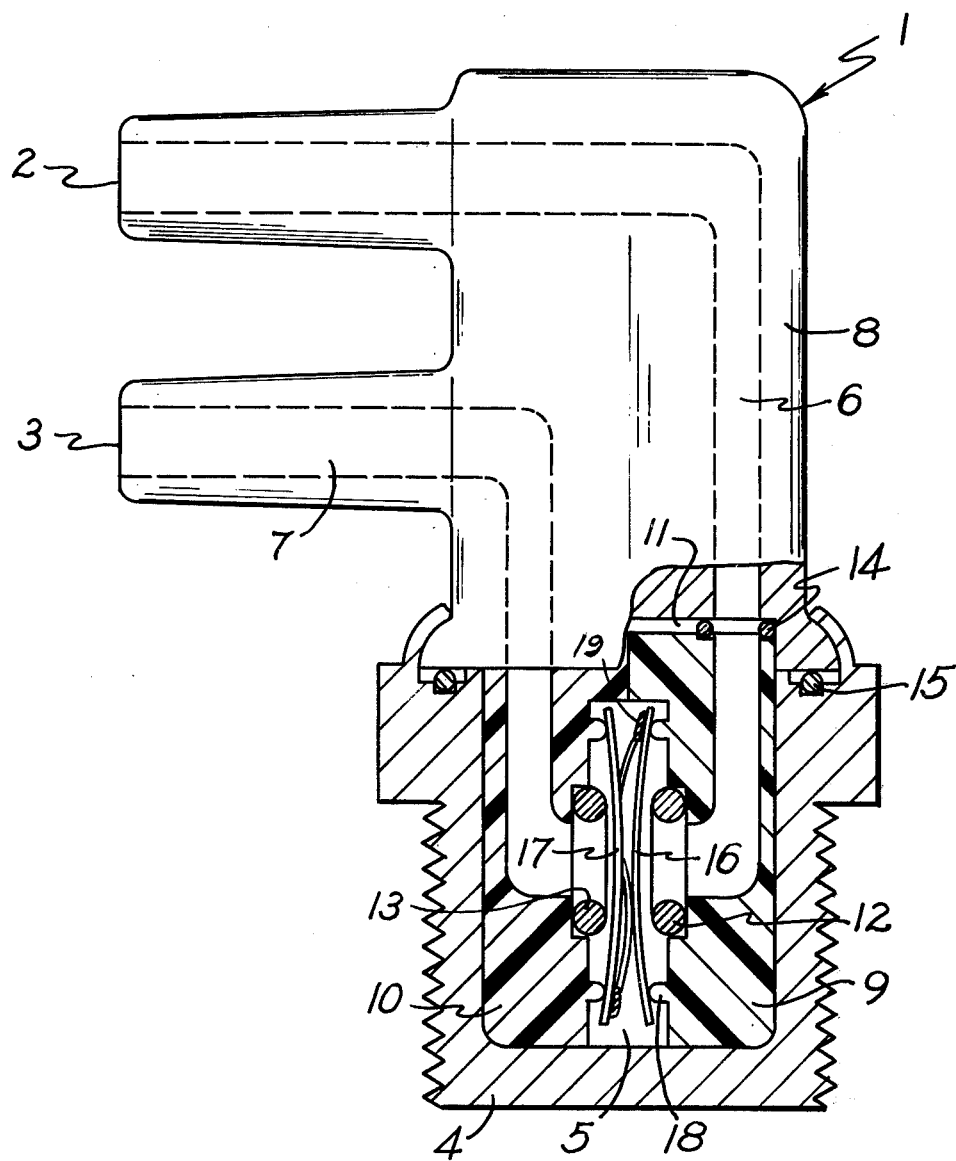
FIG. 1 is a side elevation view, partially in section, of the thermally responsive valve means of this invention.

Referring to the drawings wherein the invention is explained on the basis of examples, FIG. 1 illustrates a preferred embodiment of the thermally-responsive dual temperature valve of this invention.

As shown in FIG. 1, the main valve body 1 has two openings 2 and 3 and has an installing or mounting part 4 formed at the lower portion of the valve body. In a case where the valve is used in an emission control system of an automobile, for example, the opening 2 is connected with a negative pressure side of the emission control system and the opening 3 is connected to the atmosphere. The valve is installed on the engine block of an automobile by utilizing mounting threads which are provided on the installing part 4.

An internal operating space 5 is formed inside the main valve body 1. The valve openings 2 and 3 are connected by separate internal passage ways 6 and 7 to the internal operating space 5 and are thereby connected with each other through the operating space. For convenience in manufacturing, it is preferable to make the main valve body with two or three separate parts. For example, as shown in FIG. 1, it is preferable that the main valve body be made of three separate parts including parts 8, 9 and 10.

Valve body part 8 forms the openings 2 and 3 and forms portions of the internal body passages 6 and 7. Valve body part 8 is preferably formed or molded of a hard synthetic resin. Valve body parts 9 and 10 are more or less symmetrical around the vertical line A—A which passes through the operating space 5, each of the valve body parts 9 and 10 having a recess which extends longitudinally to form a part of the operating space 5 and each has a passage forming a portion of an internal passage 6 or 7 opening into the operating space 5.

Accordingly, the main valve body 1 is assembled by inserting the ends of the two body parts 9 and 10 into a recess indicated at 11 in FIG. 1, in the body part 8 and the installing part 4 is fitted over body parts 9 and 10 and is swaged over the end of body part 8 to hold the valve in assembled relation. It is preferable that the installing part 4 be made of a metal having a high degree of heat conductivity but the body parts 9 and 10 are formed either of a hard synthetic resin or a thermally conductive metal.

At the location where the internal passages 6 and 7 open into the internal operating space 5, the body parts 9 and 10 are provided with respective O-rings or gaskets 12 and 13 or the like. These O-rings serve as valve seats for bimetal elements which are described below. In addition, there is provided a seal packing or gasket 14 between the body part 8 and the body parts 9 and 10. Numeral 15 indicates an O-ring or gasket which is also preferably inserted between the body part 8 and the installing part 4.

In the valve operating space 5, there are provided two thin dish-shaped bimetal elements 16 and 17 arranged with a central axes of the elements disposed transversely to the longitudinal direction of the valve indicated by the line A—A. As will be understood, these dish-shaped bimetal elements are of conventional design and are adapted to move with snapaction from an initial dish-shape to a reverse or inverted dish shape when the bimetal element is heated through a temperature level which is characteristic of the particular bimetal element. In the valve of this invention, the bimetal elements 16 and 17 are supported within the internal operating space 5 by engagement of the peripheries of the elements with the valve body parts 9 and 10. That is, a selected number of protuberances 18 are formed on each of the body parts 9 and 10 within the recesses formed in these parts and the peripheries of the bimetal elements 16 and 17 are engaged on these protuberances. In addition, a wave-shaped annular spring 19 is inserted between the bimetal elements 16 and 17 whereby the elements are mutually separated from each other and are compressively held against the protuberances 18 on the body parts 9 and 10, thereby dividing the operating space 5 into three sections.

Figure 2A:
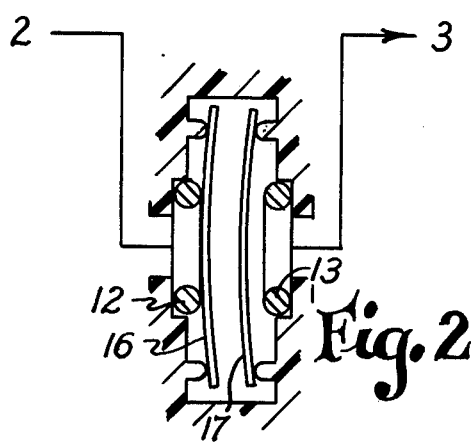
FIGS. 2a, 2b, 2c and 2d are diagrammatic views illustrating stages in operation of the valve of FIG. 1.
Figure 3A:
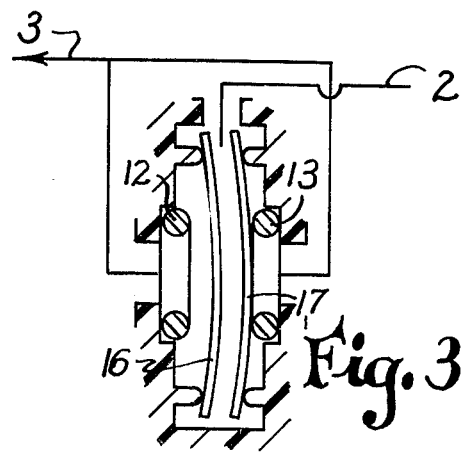
FIGS. 3a, 3b, 3c and 3d are diagrammatic views similar to FIG. 2 illustrating stages in operation of an alternative embodiment of the valve of this invention.

FIGS. 2a, b, and c diagrammatically illustrate operation of the valve described in FIG. 1. In FIG. 2, the spring 19 is omitted for the purpose of improved clarity. Thus, referring to FIG. 2, when the valve is at a selected temperature, the bimetal elements 16 and 17 are in a state or condition as shown in FIG. 2a, the opening 2 being closed by engagement of the bimetal 16 with the O-ring 12 (valve seat). As a result, flow of fluid between the openings 2 and 3 is prevented and the valve is closed. When the valve temperature rises from this initial selected temperature level, the bimetal element 16 moves with snap-action to the reverse dish shape illustrated in FIG. 2b when the temperature of that bimetal element reaches a predetermined level characteristic of that bimetal element. When the elements 16 and 17 are in the disposition illustrated in FIG. 2b, each of the valve openings 2 and 3 is connected to the operating space 5, fluid is permitted to flow between the openings 2 and 3, and the valve is in open condition. Then when the temperature of the valve rises to a further extent, the bimetal element 17 moves with snap-action to the dish position shown in FIG. 2c as the temperature of that bimetal element reaches a predetermined second, higher level which is characteristic of the bimetal element 17. In this dish position of the bimetal element 17, the element engages the O-ring 13, fluid flow is prevented between the valve openings 2 and 3, and the valve is in closed condition.

As will be understood, when the temperature of the valve illustrated in FIG. 2 is thereafter decreased, the reverse procedure takes place. That is, as the valve temperature decreases in a unidirectional manner passing through two temperature levels, the bimetal element 17 initially moves with snapaction from the dish position shown in FIG. 2c to the position shown in FIG. 2b, thereby opening the valve. Then subsequently as the valve temperature further decreases, the bimetal element 16 moves with snap-action from the dish position shown in FIG. 2b to the dish position shown in FIG. 2a, thereby reclosing the valve. It will be understood that when the bimetal element moves from an initial dish-shape configuration to an inverted dished configuration, the snapping movement of the disc to the inverted disc configuration occurs at a first selected temperature. However, when the element is subsequently cooled and moves with snap-action to return to its initial dished configuration, this return snap-action occurs at a second relatively lower temperature. Thus, as the valve illustrated in FIGS. 1 and 2 is heated through the two operating temperatures of the bimetal elements 16 and 17 and is then subsequently cooled through the two reset temperatures of the bimetal element 16 and 17, the reverse sequence of opening and closing of the valve occurs at different temperatures, thus, as illustrated in FIG. 2d closing and opening the valve during increase of valve temperature is illustrated by curve a whereas resetting of the valve during cooling of the valve is illustrated by curve b. In this way, using the hysteresis effect of the bimetal elements, is possible to arrange opening and closing of the valve to occur at one set of temperature levels during heating and at a second set of temperature levels during cooling.

Figure 2B:
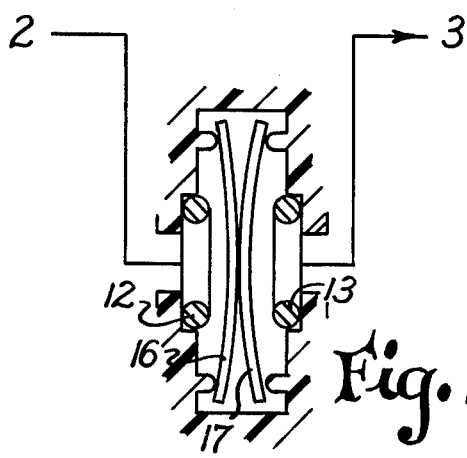
Figure 3B:
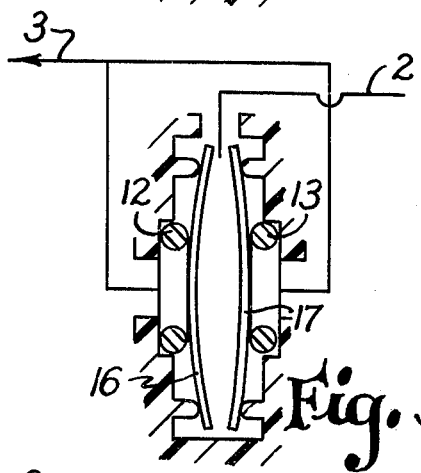
Figure 2C:
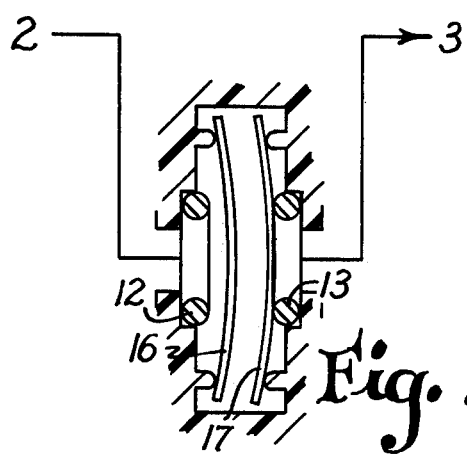
Figure 3C:
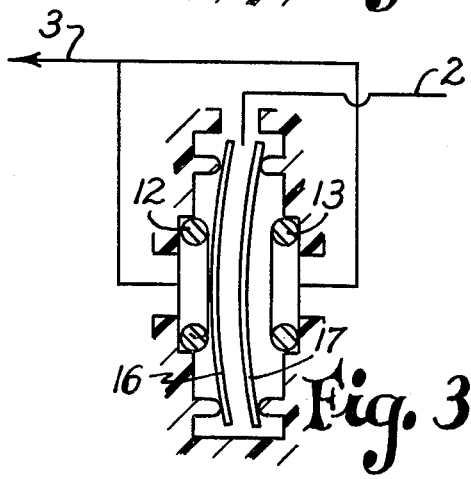
Figure 2D:
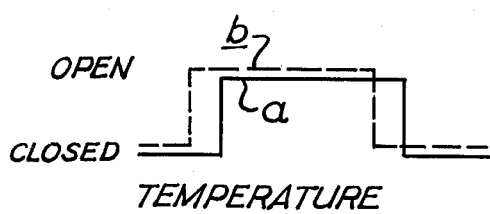
Figure 3D:
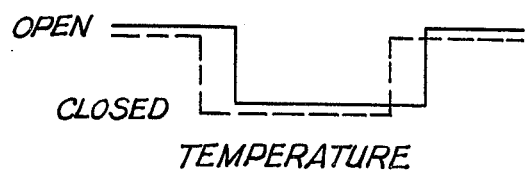

If the thermally responsive valve of this invention is used in an ignition timing control system in an automobile, and if the opening 3 is connected with the atmosphere while opening 2 is connected with the distributor, the distributor progresses when the valve is in the dish position shown in FIG. 2a, the progress of the distributor stops when the valve is in the dish position shown in FIG. 2b, and the distributor starts progressing once again when the valve moves to the dish position shown in FIG. 2c.

In an alternate embodiment of this invention, as is diagrammatically illustrated in FIG. 3, the internal valve passage leading from the valve opening 2 is arranged to enter the operating space 5 at a location between the bimetal elements 16 and 17. Two separate internal passage ways are then arranged to connect the valve opening 3 to the operating space 5 as illustrated in FIG. 3. In this arrangement, the bimetal elements are selected to remain in the dish-shaped dish position shown in FIG. 3a at a first temperature, thereby permitting fluid flow between the openings 2 and one of the internal passages leading to the opening 3 so that the valve is in open condition. Then, when the valve is heated to a relatively higher temperature such that the bimetal element 16 moves with snap-action to the dish position shown in FIG. 3b, the elements 16 and 17 close both of the passages leading to the opening 13 so that the valve is closed. Then, on further heating of the valve through a second temperature level, the bimetal element 17 moves with snap-action to the dish position shown in FIG. 3c, for reopening the valve and for permitting fluid to flow from the opening 2 through the operating space 5 to the opening 3 through the other internal passage leading to the opening 3. As illustrated in FIG. 3d, the difference in operating temperature and reset temperature of the elements 16 and 17 is similarily adapted to provide opening and closing of the valve at different temperatures depending upon whether the change in valve temperature is increasing or decreasing. As will be understood, if the valve whose operation is illustrated in FIG. 3 is used in an ignition timing control system in an automobile, the opening 2 is connected with the distributor and the opening 3 is connected with the carburetor.

It will be understood that various modifications of the disclosed embodiments of the valve of this invention are possible within the scope of this invention. For example, where the valve body members 9 and 10 are formed from materials of low thermal conductivity, it is possible to form a tongueshaped piece on the wave-shaped annular spring and to extend this tongue into contact with the installing part 4 made of metal, thereby to improve heat conductivity between the bimetals 16 and 17 and the object upon which the valve is mounted. It should be understood that this invention includes all modifications and equivilence of disclosed embodiments of this invention which fall within the scope of the apended claims.

I claim:

1. A valve responsive to unidirectional temperature change through two temperature levels for moving, as the valve passes through said respective temperature levels, from a first operating condition to a second operating condition and then from said second operating condition to said first operating condition, said valve comprising valve body means defining an internal operating space, a pair of valve openings, and passages extending from said openings into said operating space providing communication between said openings through said operating space, a first dish-shaped bimetal element disposed in said operating space to be movable with snap-action from an original dished configuration to an inverted dished configuration in response to a change in temperature through a first selected temperature level, a second dish-shaped bimetal element disposed in said operating space to be movable with snap-action from an original dished configuration to an inverted dished configuration in response to a change in temperature through a second relatively higher temperature level, and a pair of valve seat means disposed between the operating space and respective passages to be engaged and disengaged by respective bimetal elements for closing and opening passages when said elements move between said element configurations, said passages being arranged relative to the engagement and disengagement of said elements with said valve seat means to establish a first valve operating condition at a valve temperature below said first temperature level, to establish a second valve operating condition at a valve temperature between said first and second temperature levels and to establish said first valve operating condition at a valve temperature above said second temperature level.

2. A valve responsive to unidirectional temperature change through two temperature levels for moving, as the valve passes through said respective temperature levels, from a closed-valve operating condition to an open-valve operating condition and then from said open-valve operating condition to a closed valve operating condition, said valve comprising valve body means defining an internal operating space, a pair of valve openings, and a pair of passages extending from the respective openings into the operating space to provide communication between the openings through the operating space, a pair of valve seat means disposed between the operating space and respective passages, a first dish-shaped bimetal element disposed in the operating space in an original dished configuration engaging one of the valve seat means for closing communication between said openings, said first element being movable with snap-action to an inverted dished configuration to disengage said one valve seat means for permitting communication between said openings when heated through a first selected temperature level, and a second dish-shaped bimetal element disposed in the operating space in an original dished configuration disengaged from the other valve seat means for permitting communication between said openings, said second element being movable with snap-action to an inverted dished configuration to engage the other valve seat means for closing communication between said openings when heated through a second relatively higher temperature level.

3. A valve as set forth in claim 2 having said bimetal elements disposed in spaced relation to each other within said operating space and having an annular wave-shaped spring disposed between said elements urging said elements toward said respective valve seat means.

4. A valve as set forth in claim 3 having protuberances extending from said body means into said operating space around each of said valve seat means and having said elements arranged with the peripheries thereof engaging respective groups of said protuberances for permitting central portions of said elements to engage and disengage respective valve seat means.

5. A valve as set forth in claim 4 having a mounting element of metal having relatively high thermal conductivity secured to said valve body means for mounting said valve in heat-transfer relation to an object subject to variations in temperature.

6. A valve as set forth in claim 5 wherein said valve body means comprises a first valve body part defining said openings and having passage portions extending from said openings to one side of said first body part, and second and third body parts each having a recess therein and having a passage portion extending from said recess, said second and third body parts being secured to said first body part by said mounting element with said recesses cooperating to form said internal operating space and said passage portions cooperating to form said passages extending from said openings into said operating space.

7. A valve responsive to unidirectional temperature change through two temperature levels for moving, as the valve passes through said respective temperature levels, from an open-valve operating condition to a closed-valve operating condition and then from said closed-valve operating condition to an open-valve operating condition, said valve comprising valve body means defining an internal operating space, two openings extending into the body means, a pair of first passages extending from one of said openings into opposite sides of said operating space, and an additional passage extending from the other of said openings into the operating space between said first passages, a pair of valve seat means disposed between said operating space and said respective first passages, a first dish-shaped bimetal element disposed in the operating space in an original dished configuration disengaging one of said valve seat means for permitting communication between said openings over said one valve seat means, said first element being movable with snap-action to an inverted dished configuration when heated through a first temperature level to engage said one valve seat means for preventing communication between said openings over said one valve seat means, and a second dish-shaped bimetal element disposed in the operating space in an original dished configuration disengaging the other of said valve seat means for permitting communication between said openings over said other valve seat means, said second element being movable with snap-action to an inverted dished configuration when heated through a second relatively higher temperature level to engage said other valve seat means for preventing communication between said openings over said other valve seat means.

8. A valve as set forth in claim 7 having said bimetal elements disposed in spaced relation to each other within said operating space and having an annular wave-shaped spring disposed between said elements urging said elements toward said respective valve seat means.

9. A valve as set forth in claim 8 having protuberances extending from said body means into said operating space around each of said valve seat means and having said elements arranged with the peripheries thereof engaging respective groups of said protuberances for permitting central portions of said elements to engage and disengage respective valve seat means.

10. A valve as set forth in claim 9 having a mounting element of metal having relatively high thermal conductivity secured to said valve body means for mounting said valve in heat-transfer relation to an object subject to variations in temperature.

11. A valve as set forth in claim 10 wherein said valve body means comprises a first valve body part defining said openings and having passage portions extending from said openings to one side of said first body part, and second and third body parts each having a recess therein and having passage portions extending from said recess, said second and third body parts being secured to said first body part by said mounting element with said recesses cooperating to form said internal operating space and said passage portions cooperating to form said passages extending from said openings into said operating space.

* * * * *